(12) United States Patent
Catha et al.

(10) Patent No.: US 7,258,141 B2
(45) Date of Patent: Aug. 21, 2007

(54) PIPE LINER APPARATUS AND METHOD

(76) Inventors: Stephen C. Catha, 410 Pierce St., Houston, TX (US) 77002; Kenneth R. Charboneau, 213 Ranger Pl., Slidell, LA (US) 70458; Ivan C. Mandich, 131 Nursery Ave., Metairie, LA (US) 70005

( * ) Notice: Subject to any disclaimer, the term of this patent is extended or adjusted under 35 U.S.C. 154(b) by 145 days.

(21) Appl. No.: 11/250,305

(22) Filed: Oct. 14, 2005

(65) Prior Publication Data

US 2006/0124188 A1    Jun. 15, 2006

Related U.S. Application Data

(60) Provisional application No. 60/635,467, filed on Dec. 13, 2004.

(51) Int. Cl.
 *F16l 55/16* (2006.01)
(52) U.S. Cl. .................... 138/98; 138/97; 138/114; 138/130; 264/36; 264/516; 405/150.1; 405/184.1; 156/292; 156/287; 156/187
(58) Field of Classification Search ............. 138/98, 138/97, 129, 140, 114, 130; 156/292, 187, 156/287; 405/150.1, 184.1; 264/36, 516
See application file for complete search history.

(56) References Cited

U.S. PATENT DOCUMENTS

| | | | | |
|---|---|---|---|---|
| 3,894,328 A | * | 7/1975 | Jansson | 29/451 |
| 4,207,130 A | * | 6/1980 | Barber | 156/244.13 |
| 4,863,365 A | * | 9/1989 | Ledoux et al. | 425/343 |
| 4,985,196 A | * | 1/1991 | LeDoux et al. | 264/516 |
| 4,986,951 A | * | 1/1991 | Ledoux et al. | 264/516 |
| 5,034,180 A | * | 7/1991 | Steketee, Jr. | 264/516 |
| 5,091,137 A | * | 2/1992 | Ledoux | 264/516 |
| 5,112,211 A | * | 5/1992 | LeDoux et al. | 425/384 |
| 5,342,570 A | * | 8/1994 | Ledoux et al. | 264/566 |
| 5,385,173 A | * | 1/1995 | Gargiulo | 138/98 |
| 5,395,472 A | * | 3/1995 | Mandich | 156/287 |
| 5,487,411 A | * | 1/1996 | Goncalves | 138/98 |
| 5,525,049 A | * | 6/1996 | Paletta | 425/62 |
| 5,698,056 A | * | 12/1997 | Kamiyama et al. | 156/218 |
| 5,810,053 A | * | 9/1998 | Mandich | 138/98 |
| 5,861,116 A | * | 1/1999 | Mandich | 264/35 |
| 5,934,332 A | * | 8/1999 | Rodriguez et al. | 138/98 |
| 6,058,978 A | * | 5/2000 | Paletta et al. | 138/98 |
| 6,089,275 A | * | 7/2000 | Steketee, Jr. | 138/98 |
| 6,723,266 B1 | * | 4/2004 | Lippiatt | 264/173.17 |
| 6,935,376 B1 | * | 8/2005 | Taylor et al. | 138/98 |

\* cited by examiner

*Primary Examiner*—Patrick F. Brinson
(74) *Attorney, Agent, or Firm*—Juan J. Lizarraga

(57) ABSTRACT

A thermoplastic pipe liner assembly and method for installation in a pipeline by pulling the pipe liner assembly through the pipeline in a temporarily folded condition wherein the thermoplastic pipe liner assembly has a core inner liner, an outer liner with optional grooving for annular communication, orbitally wound strength and intermediate layers, two or more tension deformation members to sustain the tension needed to pull the pipe liner assembly through the pipeline for several miles and to assist in maintaining the temporarily folded condition. Also included are optional instrumentation circuits. Also disclosed is a method for the manufacture of the pipe liner assembly and concurrent installation in a pipeline.

12 Claims, 3 Drawing Sheets

PIPE LINER APPARATUS AND METHOD

This application claims priority from U.S. provisional application Ser. No. 60/635,467 ("the '467 application") filed Dec. 13, 2004. The '467 application is incorporated herein by reference.

BACKGROUND OF THE INVENTION

This invention relates an apparatus and method for the installation of reinforced thermoplastic liners in pipelines, whether during the initial manufacturing of the pipeline, or in later renovation, upgrade or repair. In either case, the useful life of the pipeline is increased by the added burst strength of the liner and the corrosion protection afforded by the liner. To protect against damage to existing pipelines, corrosion resistant thermoplastic liners have been used to eliminate the need for excavating and replacing pipeline, which can be very costly.

The use of thermoplastic liners for protecting the interior of a pipeline has been disclosed in numerous references beginning with French Patent, 81 07346 (Laurent) and pipelining processes are further exemplified in U.S. Pat. Nos. 4,496,449; 4,394,202; 4,207,130; 4,985,196; and 3,429,954. However, these processes have proven to be only somewhat successful in relatively low-pressure pipelines with application in existing pipelines of no more than one to two miles in length.

In the past, essentially two types of liners for pipelines, loose fitting liners and tight fitting liners, were used. A loose fitting liner has been described as one that contains the pressure of the fluid or gas in the liner. A tight fitting liner is flush against and tightly engaged with the interior wall of the pipeline. The tight fitting liner is physically supported by the pipeline and so may depend on the strength of the pipeline to contain the pressure of the fluid or gas in the pipeline. Tight fitting liners offer certain advantages over loose fitting liners in that they may be less expensive, they do not have to bear significant loads, and they maintain the greatest possible inside diameter. Several methods of installing tight fitting liners are described in U.S. Pat. Nos. 5,072,622; 3,856,905; 3,959,424; and 3,462,825.

Unfortunately, there are problems with tight fitting liners. Although a tight fitting liner protects the interior of the pipeline from corrosion it does not protect the exterior of the pipeline. Corrosion damage may weaken the physical strength of the pipeline to the point where it is unable to bear the pressure within and cause leakage. Since the traditional tight fitting liner depends on the strength of the pipeline to contain the pressure of the fluid or gas in the pipeline, if the pipeline fails, the liner will fail. Failure of the liner and pipe will result in significant replacement cost and may be catastrophic to the environment depending on the nature of the substance contained in the pipeline.

Thus, repairing an existing pipeline by installing a liner as heretofore available does not solve all the problems associated with pipelines. These problems have been addressed by designing a liner with multi layers with sufficient strength to contain the pressure of the pipeline within which the liner is fitted and by incorporating leak detection and stress monitoring systems in the liner as disclosed in U.S. Pat. No. 5,551,484 (Charboneau). An alternative leak detection system for a tight fitting liner is disclosed in U.S. Pat. No. 5,072,622 (Roach, Whitehead) as well as the use of annular channels as disclosed in U.S. Pat. No. 6,220,079 (Taylor, Roach).

Even after the problems of burst strength and monitoring were addressed, there was another problem. Typically most processes for insertion of a liner in a pipeline involve the step of deforming or temporarily folding the liner into a cross section smaller than the receiving pipeline so that the liner might be drawn or pulled through the pipeline and eventually restored to its full cylindrical cross section and tightly fitting within the pipeline as disclosed in U.S. Pat. Nos. 5,395,472, 5,810,053 and 5,861,116 (Mandich). It can be seen that the length of liner, which could be installed intact, was limited by the longitudinal strength of the liner itself. In many oil and gas pipelines, particularly offshore where the length of the pipeline may exceed several miles, the installation of high burst strength tight fitting liners was impossible.

SUMMARY OF THE INVENTION

The present invention provides an apparatus and method for the continuous installation of a temporarily folded multi layer reinforced thermoplastic liner assembly with integral monitoring systems in a pipeline exceeding one mile in length, expanding the temporarily folded liner assembly to its original shape and taking steps to insure that the liner tightly fits in the pipeline.

The core inner liner of the thermoplastic liner assembly embodied in this invention may be either extruded from thermoplastic material to form a continuous tube or finite lengths of thermoplastic pipe are fused together to form a continuous tube. This continuous tube which forms the core inner liner of the thermoplastic liner assembly is pulled through orbital winding devices which wind at least two reinforcing strength layers on the outer surface of the core inner liner and wind more than one intermediate layers over the reinforcing strength layers. The reinforcing strength layers and intermediate layers are intended to increase the radial burst strength of the thermoplastic liner assembly and achieve sufficient strength to contain the pressure of the pipeline within which the thermoplastic liner assembly is installed.

While the core inner liner is being pulled through the orbital winding devices, at least two tension deformation members are longitudinally installed in proximity to the reinforcing strength layers and secured by the intermediate layers. The tension deformation members are flexible high strength members which serve a dual purpose. The first is to provide the necessary tensile strength to withstand the tensile force needed to pull a thermoplastic liner assembly through a pipeline several miles long. The second purpose is to help maintain the thermoplastic liner assembly in a temporarily folded or deformed configuration by virtue of the extreme tension in the tension deformation members when the thermoplastic liner assembly is being pulled through a pipeline.

Concurrently with the installation of the tension deformation members, a variety of instrumentation circuits may be installed in parallel to the tension deformation members, likewise along the longitudinal axis of the thermoplastic liner assembly in proximity to the reinforcing strength layers and secured by the intermediate layers. These instrumentation circuits may include a variety of transponder, communication, censoring, vacuuming, optic fiber, electrical, capacitance, thermal or other elements, none of which would be damaged by the extreme tension needed to pull the thermoplastic liner assembly through miles of pipeline.

The core inner liner with orbitally wound layers, tension deformation members and instrumentation circuits is then wrapped with an outer liner which may have single or multiple layers of thermoplastic material. The outer surface of the outer liner may be provided with grooves or channels creating annular passageways between the thermoplastic liner assembly and the pipeline for monitoring, inspecting, permeated gas removal and communication. Likewise the inner surface of the outer liner may be provided with grooves or channels to achieve the same functions as the grooves or channels on the outer surface.

As a next step in the installation of the thermoplastic liner assembly in a pipeline, the thermoplastic liner assembly is folded into a "C" or "U" or a "W" cross sectional shape by a deformation device, typically a series of rollers and wheels.

The pulling end of the thermoplastic liner assembly is fitted to a pulling head which is connected to a pulling cable which will be drawn through the pipeline by a tensioning device such as a winch at the completion end of the pipeline. The pulling head and cable are connected to allow the primary pulling force to be exerted on the tension deformation members alone and not on any of the other elements of the thermoplastic liner assembly. It is intended that the tension deformation members under tension will create a centering effect which will serve to hold the thermoplastic liner assembly in its temporarily folded or deformed cross sectional shape until it is reshaped to tightly fit within the pipeline. Temporary tabs may also be used to assist in holding the thermoplastic liner assembly in its deformed shape until it is reshaped to tightly fit within the pipeline.

It is an object of the present invention to provide an improved liner assembly for installation in a pipeline of cylindrical cross section, said pipeline having an inner surface and an outer surface and having a beginning end and a completion end, said liner assembly having a longitudinal axis and a pulling end and initially manufactured with cylindrical cross section that is temporarily folded to facilitate insertion and installation in a pipeline by a tensioning device pulling on the pulling end of the liner assembly, said liner assembly further comprising a core inner liner with an inner surface and an outer surface, at least two strength layers orbitally wound upon the outer surface of the core inner liner; more than one intermediate layers orbitally wound over the strength layers, at least two tension deformation members to sustain the tension generated by the tensioning device during installation in a pipeline and to assist in causing the liner assembly cross section to remain temporarily folded during installation in the pipeline, said tension deformation members longitudinally placed in proximity to and secured by the intermediate layers; at least one instrumentation circuit longitudinally placed in proximity to and secured by the intermediate layers; and an outer liner with an inner surface and an outer surface placed over the intermediate layers.

It is a further object of this invention to provide an improved method for installation of an improved liner assembly in a pipeline of cylindrical cross section, said pipeline having an inner surface and an outer surface and having a beginning end and a completion end, said liner assembly having a longitudinal axis, and a pulling end and initially manufactured with cylindrical cross section that is temporarily folded to facilitate insertion and installation in a pipeline by a tensioning device pulling on the pulling end of the liner assembly; comprising the steps of: providing a continuous length of core inner liner of cylindrical cross section with an inner surface and outer surface; orbitally winding at least two strength layers upon the outer surface of the core inner liner; orbitally winding more than one intermediate layer over the strength layers; longitudinally placing at least two tension deformation members in proximity to and secured by the intermediate layers, wherein said tension deformation members sustain the tension generated by the tensioning device during installation in a pipeline and assist in causing the liner cross section to remain temporarily folded during installation in the pipeline; longitudinally placing at least one instrumentation circuit in proximity to and secured by the intermediate layers; placing and longitudinally sealing an outer liner with an inner surface and an outer surface over the intermediate layers; temporarily folding the liner to create a cross section of less area than the pipeline cross section to facilitate insertion and installation of the liner in the pipeline; placing a pulling head on the pulling end of the liner and fixedly attaching said pulling head to a tensioning device; engaging said tensioning device to pull pulling head from beginning end of pipeline and drawing liner assembly through pipeline to completion end of pipeline; and disengaging tensioning device from pulling head and reforming liner to cylindrical cross section thereby engaging outer surface of outer liner with inner surface of pipeline.

DETAILED DESCRIPTION OF THE INVENTION

Figure 1:
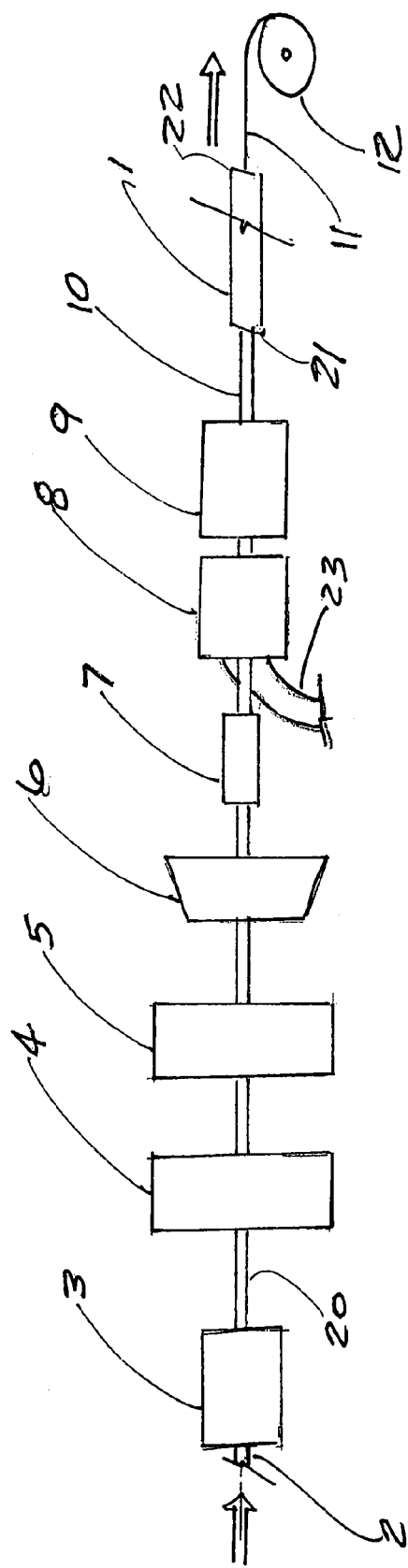
FIG. 1 is a block diagram of the installation of the inventive liner assembly.

FIG. 1 illustrates a block diagram of the installation of the inventive liner assembly in a pipeline 1. In the installation depicted in FIG. 1, the improved liner assembly is manufactured on site and pulled directly into the pipeline 1. Pipelines of between 2" and 60" diameter can be rehabilitated.

Figure 2:
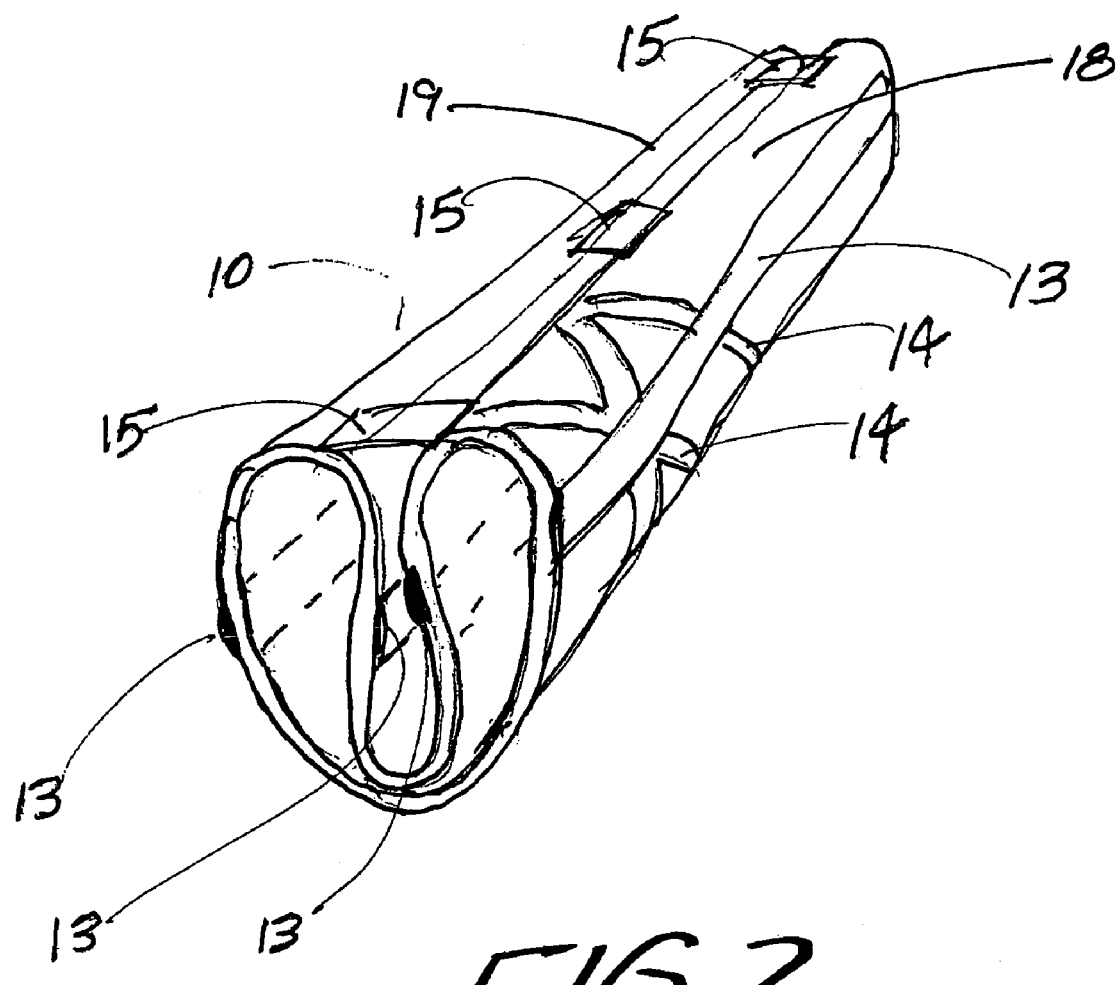
FIG. 2 is a perspective view of an embodiment of the inventive liner assembly in a temporarily folded condition for purposes of insertion into a pipeline.
Figure 3:
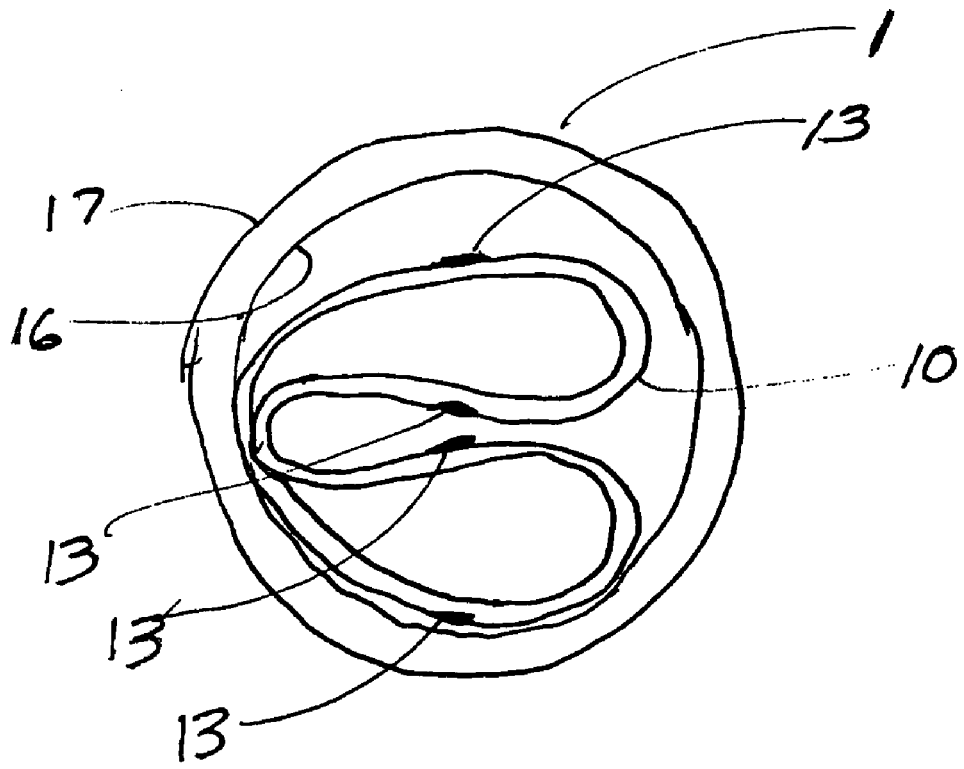
FIG. 3 shows a cross section of a pipeline with a temporarily folded liner assembly being drawn through the pipeline.

In the embodiment depicted in FIG. 1, discreet lengths of thermoplastic pipe 2 are pulled into a butt fusion machine 3 and fused to a preceding length of thermoplastic pipe 2 to form a continuous tube 20 as the core inner liner of the thermoplastic liner assembly. The continuous tube 20 is then drawn through a series of orbital winders 4 and 5, which orbitally wind reinforcing strength layers around the continuous tube 20. A third orbital winder 6 orbitally winds intermediate layers around the reinforcing strength layers while installing at least two tension deformation members 13 as shown in FIGS. 2 and 3, and installing such instrumentation circuits as may be desired.

The continuous tube 20 is drawn along by at least one puller 7. Once the continuous tube 20 has been orbitally wound with strength layers and intermediate layers, and fitted with tension deformation members 13 and instrumentation circuits, it is then wrapped with an outer liner 23 which is longitudinally fused by a longitudinal welding machine 8. Both the inner and outer surfaces of the outer liner 23 may be fitted with grooves or channels for annular monitoring, inspecting, permeated gas removal and communication.

Once fitted with an outer liner 23, the thermoplastic liner assembly, now fully assembled, is drawn through a deformation machine 9 and continuously folded into a "C", "U", or "W" cross section 10. The beginning end of the temporarily folded thermoplastic liner assembly 10 designated as the pulling end is then drawn into the beginning end 21 of a pipeline 1 and pulled by a pulling cable 11 being drawn by a tensioning device 12 at the completion end 22 of the pipeline 1.

The pulling cable 11 is attached to the pulling end of the temporarily folded thermoplastic liner assembly 10 by a pulling head, not shown, which is tied directly onto the tension deformation members 13, and configured to induce a centering effect on the temporarily folded thermoplastic liner assembly 10. The primary pulling force of the pulling head will be transferred to the tension deformation members 13 alone.

Once the temporarily folded thermoplastic liner assembly 10 has been drawn through the pipeline 1 from the beginning end 21 to the completion end 22, the tensioning device 12 and pulling head are disengaged from the pulling end of the temporarily folded thermoplastic liner assembly 10 and the thermoplastic liner assembly is reformed to a cylindrical cross section wherein the outer surface of the outer liner 23 engages the inner surface 16 of the pipeline 1 shown in FIG. 3.

FIG. 2 depicts a perspective view of one embodiment of the thermoplastic liner assembly in a temporarily folded condition 10 with a right folded side 18 and a left folded side 19. The outer liner 23 is not shown in FIG. 2 to better illustrate the tension deformation members 13. In this embodiment there are shown four tension deformation members 13, and, as illustrated, the tension deformation members 13, line up opposite each other when the thermoplastic liner assembly is temporarily folded. This configuration is intended to assist in creating a centering force or "Chinese finger" effect to hold the temporarily folded thermoplastic liner assembly 10 in its folded condition when tension is applied to the tension deformation members 13 by the pulling head as the temporarily folded thermoplastic liner assembly 10 is pulled through the pipeline 1 by the pulling cable 11.

Also shown in FIG. 2 are partial depictions of the orbitally wound layers 14 which may be either strength layers or intermediate layers. Also shown are alternative holding straps 15 between the right folded side 18 and the left folded side 19, intended to hold the thermoplastic liner assembly in its temporarily folded condition in addition to the centering effect produced by the tension deformation members 13. These holding straps 15 are designed to shear or disconnect when the temporarily folded thermoplastic liner assembly 10 is expanded to its original shape to achieve a tight fit within the pipeline 1. The holding straps 15 may be attached by adhesives or a fusion process.

FIG. 3 illustrates a cross section of a pipeline 1 with the temporarily folded thermoplastic liner assembly 10 being pulled through the pipeline 1 which has an outer surface 17 and an inner surface 16. As shown in FIG. 2, this embodiment has four tension deformation members 13.

The preferred thermoplastic material for the core inner liner and outer liner is high-density polyethylene (HDPE), but other thermoplastics may be used.

It is preferred that the reinforcing strength layers be orbitally wound to coincide with the angle of stress in the wall of a thin pressure vessel known to be 54.7 degrees from the longitudinal axis, and that the strength layers be wound in opposite directions or opposite hand to assure uniformity of reinforcement.

It is also preferred that the wound layers 14, both strength and intermediate, be made of high strength material or a combination of high strength materials such as KEVLAR®, SPECTRA®, or VECTRAN® whether in fiber or tape form. Likewise, the tension deformation members 13 must be of high strength material or a combination of high strength materials such as KEVLAR® or SPECTRA® or VECTRAN® or carbon fiber.

The pulling cable 11 is preferably a high strength synthetic cable such as PLASMA® 12 Strand by Puget Sound Rope.

It is also intended that adhesive or other fusion techniques may be used to install or enhance the installation of any of the wound layers 14, the tension deformation members 13, or any of the instrumentation circuits installed in the thermoplastic liner assembly.

It is also intended that the outer liner of the thermoplastic liner assembly may be grooved on one or both sides for creating annular passageways between the thermoplastic liner assembly and the pipeline or between the outer liner and the intermediate layer for monitoring, inspecting, permeated gas removal and communication.

We claim:

1. An improved liner assembly for installation in a pipeline of cylindrical cross section, said pipeline having an inner surface and an outer surface and having a beginning end and a completion end, said liner assembly having a longitudinal axis, and a pulling end and initially manufactured with cylindrical cross section that is temporarily folded to facilitate insertion and installation in a pipeline by a tensioning device pulling on the pulling end of the liner assembly, said liner assembly further comprising a core inner liner with an inner surface and an outer surface, at least two strength layers orbitally wound upon the outer surface of the core inner liner; more than one intermediate layers orbitally wound over the strength layers, at least two tension deformation members to sustain the tension generated by the tensioning device during installation in a pipeline and to assist in causing the liner assembly cross section to remain temporarily folded during installation in the pipeline, said tension deformation members longitudinally placed in proximity to and secured by the intermediate layers; at least one instrumentation circuit longitudinally placed in proximity to and secured by the intermediate layers; and an outer liner with an inner surface and an outer surface placed over the intermediate layers.

2. An improved liner assembly according to claim 1 where the core inner liner is high-density polyethylene.

3. An improved liner assembly according to claim 1 where the outer liner is high-density polyethylene.

4. An improved liner assembly according to claim 2 where the outer liner is high-density polyethylene.

5. An improved liner assembly according to claim 1 where the tensioning device further comprises a pulling cable of high strength synthetic cable.

6. An improved liner assembly according to claim 1 where at least one surface of the outer liner is fitted with grooves.

7. An improved method for installation of a liner assembly in a pipeline of cylindrical cross section, said pipeline having an inner surface and an outer surface and having a beginning end and a completion end, said liner assembly having a longitudinal axis, and a pulling end for installation in a pipeline by a tensioning device pulling on the pulling end of the liner assembly; comprising the steps of:

a. providing a continuous length of core inner liner of cylindrical cross section with an inner surface and outer surface;
b. orbitally winding at least two strength layers upon the outer surface of the core inner liner;
c. orbitally winding more than one intermediate layer over the strength layers;
d. longitudinally placing at least two tension deformation members in proximity to and secured by the intermediate layers, wherein said tension deformation members sustain the tension generated by the tensioning device during installation in a pipeline and assist in causing the liner assembly cross section to remain temporarily folded during installation in the pipeline;
e. longitudinally placing at least one instrumentation circuit in proximity to and secured by the intermediate layers;
f. placing and longitudinally sealing an outer liner with an inner surface and an outer surface over the intermediate layers
g. temporarily folding the liner to create a cross section of less area than the pipeline cross section to facilitate insertion and installation of the liner assembly in the pipeline;
h. placing a pulling head on the pulling end of the liner assembly and fixedly attaching said pulling head to a tensioning device;
i. engaging said tensioning device to pull pulling head from beginning end of pipeline and draw liner assembly through pipeline to completion end of pipeline;
j. disengaging tensioning device from pulling head and;
k. reforming liner assembly to cylindrical cross section engaging outer surface of outer liner with inner surface of pipeline.

8. An improved method for installation of a liner assembly in a pipeline according to claim 7 where the provided core inner liner is high-density polyethylene.

9. An improved method for installation of a liner assembly in a pipeline according to claim 7 where the provided outer liner is high-density polyethylene.

10. An improved method for installation of a liner assembly in a pipeline according to claim 8 where the provided outer liner is high-density polyethylene.

11. An improved method for installation of a liner assembly in a pipeline according to claim 7 where the tensioning device further comprises a pulling cable of high strength synthetic cable.

12. An improved method for installation of a liner assembly in a pipeline according to claim 7 where at least one surface of the outer liner is fitted with grooves.

* * * * *